United States Patent [19]

Jones

[11] Patent Number: 5,445,406
[45] Date of Patent: Aug. 29, 1995

[54] MECHANICAL LOCK ASSEMBLY FOR A DRIVER SIDE INFLATOR

[75] Inventor: David V. Jones, South Weber, Utah

[73] Assignee: Morton International, Inc., Chicago, Ill.

[21] Appl. No.: 212,628

[22] Filed: Mar. 11, 1994

[51] Int. Cl.⁶ ............................................. B60R 21/16
[52] U.S. Cl. .................................. 280/728.2; 280/741
[58] Field of Search .................... 280/728 A, 731, 741

[56] References Cited

U.S. PATENT DOCUMENTS

| | | | |
|---|---|---|---|
| 2,472,586 | 6/1949 | Harvey | 95/53 |
| 4,538,967 | 9/1985 | Furukawa | 417/360 |
| 4,770,439 | 9/1988 | Maier et al. | 280/732 |
| 5,005,860 | 4/1991 | Mori et al. | 280/731 |
| 5,056,412 | 10/1991 | Gautier et al. | 91/368 |
| 5,141,247 | 8/1992 | Barth | 280/728 |
| 5,152,549 | 10/1992 | Aird | 280/728 |
| 5,199,740 | 4/1993 | Frantom et al. | 280/736 |
| 5,348,340 | 9/1994 | Humphreys et al. | 280/728 A |

Primary Examiner—Kenneth R. Rice
Attorney, Agent, or Firm—Mark F. LaMarre; Nick C. Kottis; Gerald K. White

[57] ABSTRACT

A device for securing an inflator to a module housing without the use of fasteners is disclosed. Flanges on the inflator pass through slots in the module housing when the inflator is rotated onto the housing. The module housing is clamped between the flanges and an inflator base plate in one embodiment. In a second embodiment the flanges engage with pockets formed on the module housing adjacent the inflator opening. Also, tabs mounted to the module housing can be engaged with flanges formed on a retention bracket by rotating the bracket into position. The retention bracket secures the inflator onto the module housing.

7 Claims, 4 Drawing Sheets

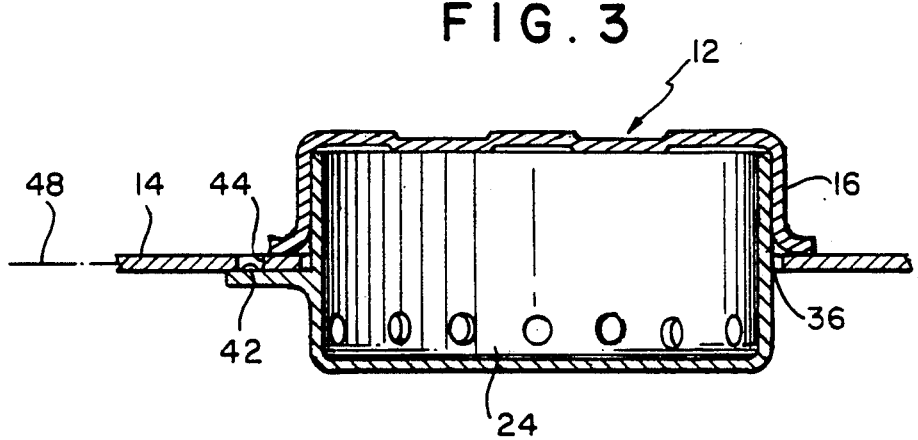
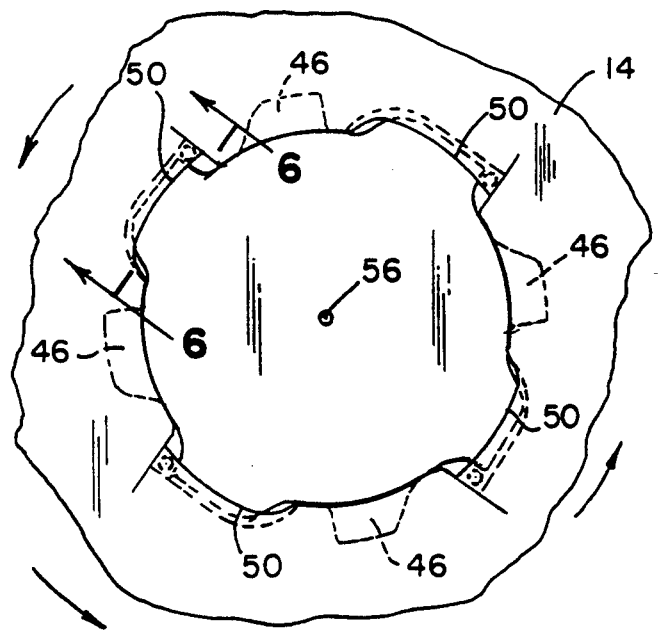
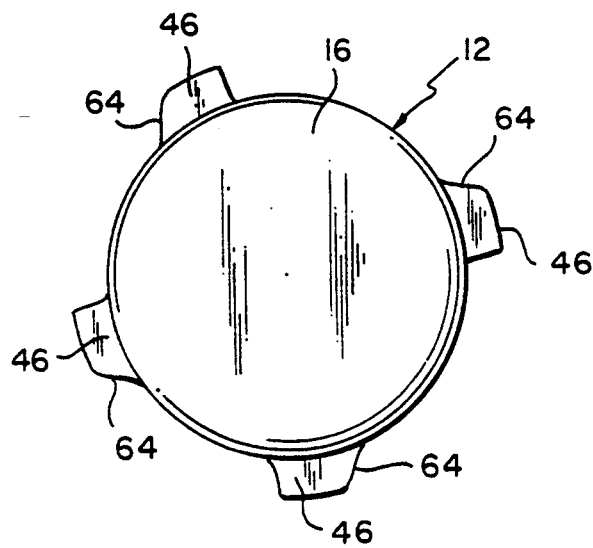

MECHANICAL LOCK ASSEMBLY FOR A DRIVER SIDE INFLATOR

BACKGROUND OF THE INVENTION

1. Field of the Invention

This invention relates generally to inflatable-type modular occupant restraint systems for passenger vehicles or, as they are more commonly known, air bag restraint systems. More particularly, this invention relates to an improved means for quickly securing a driver side inflator to an air bag module.

2. Description of Related Art

An air bag restraint system typically includes a canister, which has an open side and encloses an inflator and at least part of an air bag, and a cover which conceals the module from view. A driver side air bag module is typically mounted in the center of the steering wheel behind a protective cover. When the air bag module is designed for the passenger side of a vehicle, the container may be located just behind the vehicle dashboard, cosmetic cover, or passenger side instrument panel (hereinafter referred to as "dashboard") and the cover may form an integral part of the vehicle dashboard.

When the vehicle is involved in a collision, a crash signal initiates operation of the inflator to cause the air bag to deploy. The inflator produces an inert gas (e.g., nitrogen) which is directed under pressure into the air bag to force the air bag out of the canister incorporated in the module and into the passenger compartment of the vehicle. As the air bag is forced out of the module the pressure exerted on the driver side cover or dashboard causes selected portions of the cover or dashboard to separate, in a predetermined manner along tear seams or breakaway seams (hereinafter referred to as "tear seams") to enable the air bag to be directed into the passenger compartment.

In the conventional mounting of a driver side air bag inflator to a module housing, the air bag cushion is attached to one side of a module housing with a retainer ring. The air bag inflator is attached to the opposite side of the module housing from the air bag cushion with bolts secured with nuts. The installation of the inflator in an air bag module requires a number of fastening steps and machine steps to secure the inflator, which installation step increases the cycle time for the manufacture of a module. Further, the use of fasteners to attach the inflator to an air bag module is a major cause of reworking of the inflator module assembly due to the necessity of replacing broken or unsecured fasteners. Reworking of the inflator module is not always possible. In these situations the defective modules must be discarded, resulting in lost production and increased manufacturing costs. The elimination of fasteners in the manufacture of the air bag module assembly would eliminate a major cause for reworking and disposal of defective inflator modules. Further, a simplified attachment system which would permit easy removal of the inflator without the need for special tools would reduce the cost and time associated with reworking of the module should removal become necessary.

SUMMARY OF THE INVENTION

It is an object of this invention to overcome one or more of the problems noted hereinabove. These and other objectives of the invention, which will become apparent from the following description, have been achieved by a novel device for securing an air bag inflator to a module housing. The two-part inflator for use with this invention has a base plate attached to a top section and a number of flanges attached to the outside edge of the inflator base section. The module housing has a mounting edge, a body, and an inflator-side edge which corresponds substantially to the outside edge of the inflator base section. A plurality of slots extend radially outward from the inflator-side edge with the slots open on the inflator-side edge. The inflator is placed onto the module housing and is rotated such that the flanges pass through the slots of the module housing and the flanges engage with the module housing thereby clamping the module housing between the base plate and the flanges of the inflator. The leading edge of the flange may be beveled or angled so as to more easily move against the module housing. A bump or raised portion may be formed in the module housing to prevent the flange and thereby the inflator from rotating backward and becoming disengaged from the module housing. Alternatively, a bump or raised section can be formed on the flange with a corresponding depression in the module housing to lock the inflator in place once rotated into position.

In a second embodiment of this invention, a number of flanges are attached to the top section of the inflator near the bottom edge. A number of cuts are made radially outward of the inflator-side edge of the module housing and the body of the module housing adjacent to the cut is bent away from the plane of the module housing body in order to form cups or pockets into which the flanges of the inflator may be moved. When the inflator is placed onto the module housing and rotated the flanges engage with the pockets, thereby holding the inflator in place. The pocket may have a bump or raised portion which will engage with the flange to prevent in from moving out of position.

In another embodiment of this invention, an L-shaped tab may be attached to or formed from the body of the module housing. A flange, attached to a mounting bracket, which is inserted over the inflator and which secures the inflator, can be rotated in such a manner that the flange on the bracket engages with the L-shaped tab to hold the inflator onto the module housing. In a similar manner an L-shaped tab attached to the edge of the mounting bracket can engage with corresponding slots or apertures formed in the module housing.

BRIEF DESCRIPTION OF THE DRAWINGS

With this description of the invention, a detailed description follows with reference being made to the accompanying figures of drawings which form part of the specification related thereto, in which like parts are designated by the same reference numbers, and of which:

FIG. 2a has been simplified to show only one extending flange)

FIG. 3 is a cross-sectional view taken along line 3—3 of FIG. 1 illustrating an inflator locked into position on a module housing;

FIG. 4 is a fragmented top plan view illustrating the second embodiment of this invention for securing an inflator to a module housing;

FIG. 5 is a top plan view of the inflator of FIG. 4;

DETAILED DESCRIPTION OF THE INVENTION

Description of the Preferred Embodiment

Figure 1:
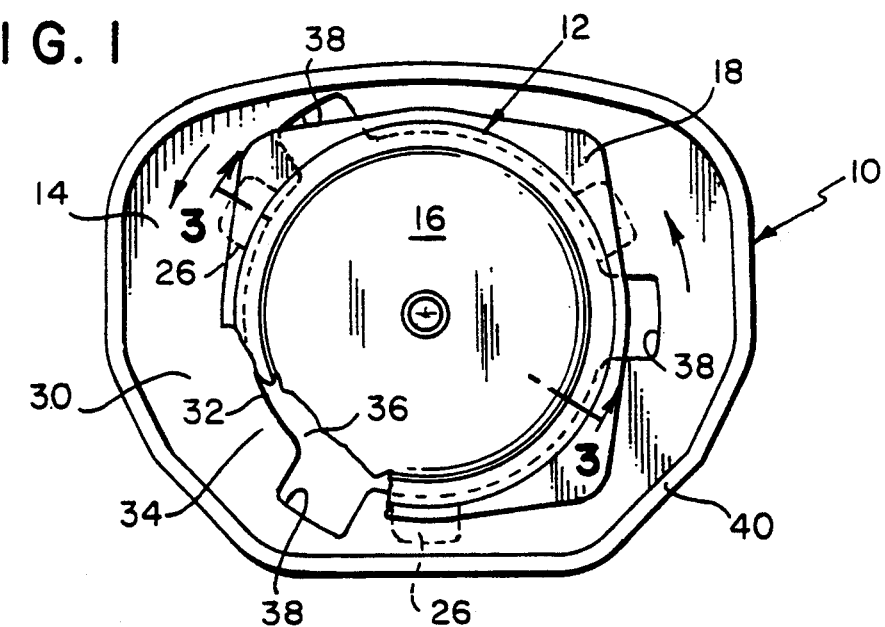
FIG. 1 is a fragmented bottom plan view of the first embodiment of this invention illustrating an inflator locked into position on a module housing.
Figure 2A:
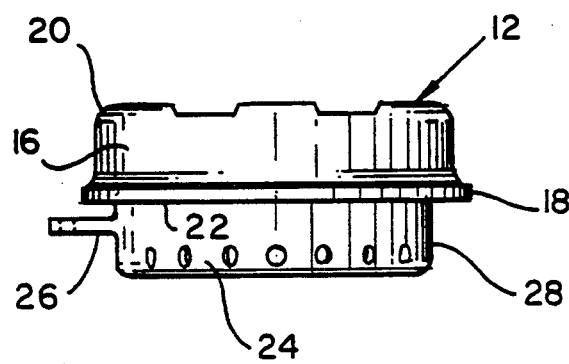
FIGS. 2a and 2b are side and top plan views illustrating the inflator of FIG. 1; (Note.
Figure 2B:
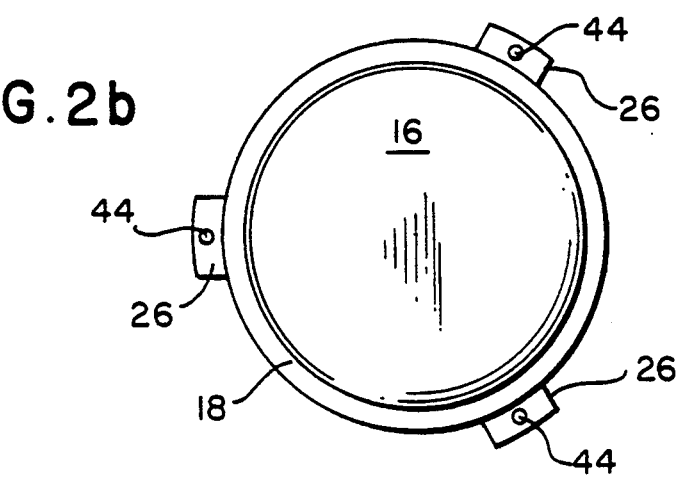

Referring to FIGS. 1, 2a, 2b and 3, a driver side inflator module (with air bag and cover removed) is shown generally at 10. The driver side module 10 comprises a driver side inflator 12 attached to a module housing 14. The inflator 12 is composed of a top section 16 with a base plate 18 formed radially outward from the top section side wall 20 adjacent to the bottom edge 22, and a bottom section 24 with a number of flanges 26 attached thereto and extending radially outward from the bottom section side wall 28. The module housing 14 has an inflator-side edge 32 formed generally in the center of the module housing body 34, the inflator-side edge 32 defining an aperture 36 for receiving the bottom section 24 of the inflator 12. A number of slots 38 formed in the module housing body 34 radially outward of the inflator-side edge 32 and continuous to the aperture 36. A mounting edge 40 is formed into the module housing 14 for securing the steering wheel cover (not shown). The inflator bottom section 24 is inserted through aperture 36 so that flanges 26 pass through slots 38 in the module housing. The inflator 12 is then rotated thereby clamping the inflator-side edge 32 of the module housing 14 between the flanges 26 and the base plate 18 of top section 16. To better lock the inflator 12 into position bumps 42 formed onto inflator flanges 26 engage with second apertures 44 formed in the module housing 14.

Figure 6A:
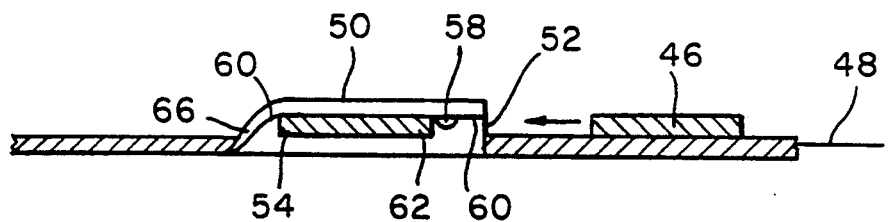
FIG. 6a is a cross-sectional view taken along line 6—6 of FIG. 4 illustrating the flange engaged in the underside of a pocket formed into the module housing at the inflator side edge.
Figure 6B:
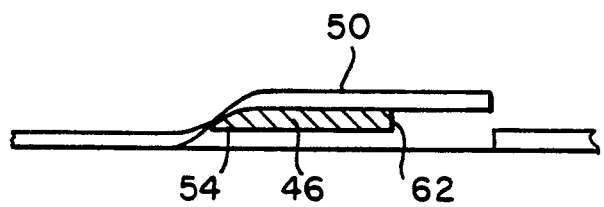
FIG. 6b is a cross-sectional view similar to that of FIG. 6a illustrating a tapered flange.

In a second embodiment as shown in FIGS. 4, 5, 6a and 6b, a number of second flanges 46 are attached to the inflator top section 16 adjacent to the bottom edge 22. The module housing 14 adjacent the inflator-side edge 32 is bent out of the plane 48 of the module housing body 34 to form a pocket 50 having an opening 52 to permit flange 26 to be inserted. The leading edge 54 of second flanges 46 is moved into the pocket 50 when inflator 12 is rotated about its center axis 56. A second bump 58 on the underside 60 of pocket 50 prevents the second flange 46 from moving backward after the trailing edge 62 of the flange 46 has moved past the second bump 58. The flange 46 may be tapered as shown in FIG. 6b and the leading edge 54 may be curved 64 as shown in FIG. 5 to better engage with the front edge 66 of pocket 50.

Figure 7:
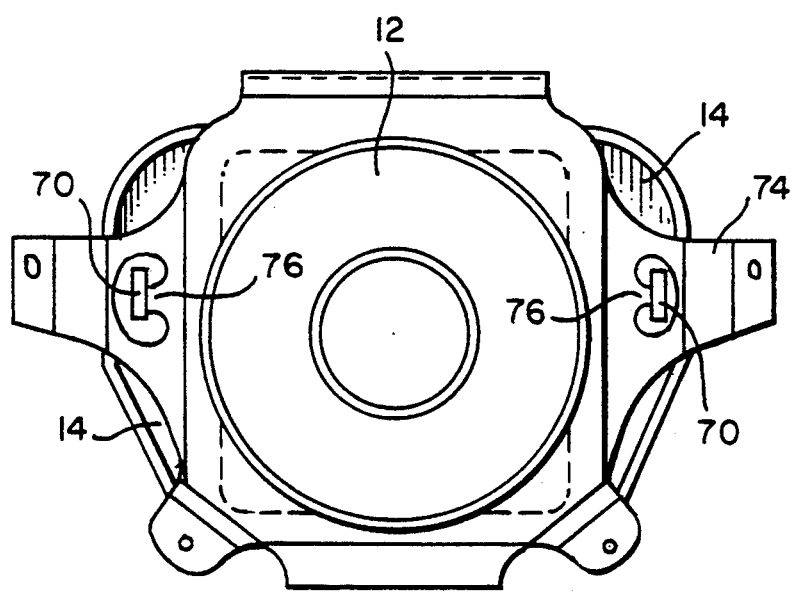
FIG. 7 is a top plan view of the third embodiment of the invention illustrating a bracket for holding the inflator onto the module housing.
Figure 8:
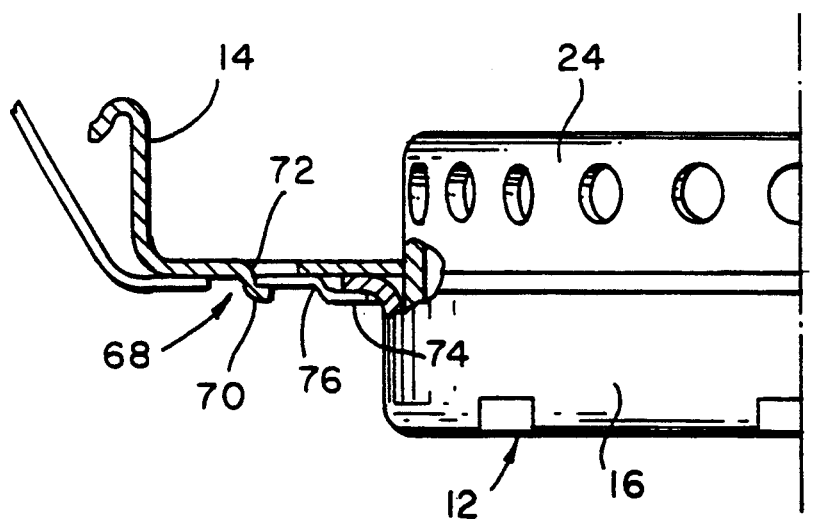
FIG. 8 is a partial view illustrating the third embodiment of this invention.
Figure 9:
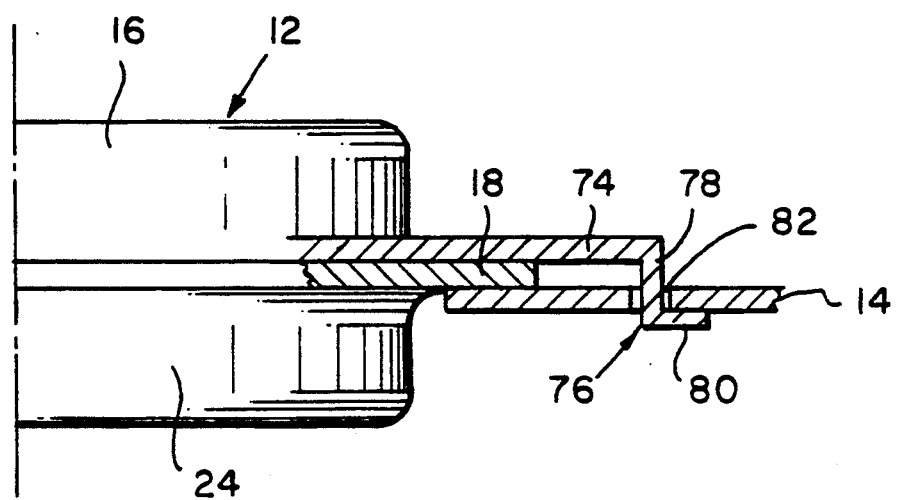
FIG. 9 is a partial view illustrating the fourth embodiment of this invention.

In a third embodiment, as shown in FIGS. 7, 8 and 9 a tab 68 with an end section 70 at an angle from the base 72 of tab 68 may be formed in module housing 14. A retention bracket 74 which is inserted over inflator 12 has a number of bracket flanges 76 attached thereto. The flanges 76 engage with the tab 68 when the retention bracket 74 is rotated into position. Alternately, a bracket tab 78, as shown in FIG. 9, may be formed into the edge of the retention bracket 74. The end section 80 of the bracket tab 78 engages with a second slot 82 in the module housing 14. The module housing 14 can be formed from aluminum, regular carbon steel or heat treated steel. The retention bracket 74 can be formed from regular carbon steel or heat treated steel.

To install the inflator 12 of the first embodiment of this invention onto a module housing 14, the inflator 12 is pressed into place and rotated to engage the flange 26 with the module housing body 34 thereby clamping the module housing 14 between the flanges 24 and base plate 18. A similar procedure will lock the inflator 12 of the second embodiment onto the module housing 14. Alternatively, a retention bracket 74 may be used as discussed under the third embodiment.

Thus, in accordance with the invention, there has been provided a quick and efficient locking mechanism for securing the inflator onto an air bag module housing without the need of fasteners or special tools.

While the above description constitutes the preferred embodiment of the present invention, it will be appreciated that the invention is susceptible to modification, variation and change without departing from the proper scope and fair meaning of the accompanying claims.

I claim:

1. An air bag inflator module assembly comprising:
   an air bag inflator comprising a top section having a substantially circular cross section, a side edge, and a base plate extending radially outward from the side edge of said air bag inflator top section; and a bottom section having a substantially circular cross section, a side edge, and a plurality of flanges having a leading edge and a trailing edge, said flanges attached to and extending radially outward from said bottom section side edge, wherein said flanges are in spaced relationship from said base plate and wherein at least one of said plurality of flanges is tapered from said leading edge to said trailing edge;
   a module housing comprising a mounting edge, a body defining a plane, said body having a top surface and a bottom surface, and an inflator-side edge which corresponds substantially to the circular cross section of the inflator bottom section, and a plurality of slots radially outward and continuous from said inflator-side edge;
   wherein said inflator is placed on said module housing and rotated such that said flanges pass through said slots of said module housing and said flanges engage with said module housing wherein said module housing body adjacent said inflator-side edge is held between said flanges and said base plate.

2. The assembly of claim 1 further comprising a depression formed on the bottom of said module housing adjacent to said slots and a bump on said flanges which engages with the depression of the bottom of said module housing to lock the inflator in position.

3. The device of claim 1 wherein a bump is formed on said bottom of said module housing in close proximity to said slot wherein after said flange passes over said bump said trailing edge will engage with said bump thereby stopping the counter rotation of said inflator.

4. An air bag inflator module assembly comprising:
   an air bag inflator comprising a top section having a substantially circular cross section, a side edge, and a plurality of flanges extending radially outward from the side edge of said air bag inflator, said flanges having a leading edge, and a trailing edge;

and a bottom section having a substantially circular cross section, and a side edge; wherein at least one of said flanges is tapered from said leading edge to said trailing edge; and a module housing comprising a mounting edge, a body defining a plane, said body having a top surface and a bottom surface, and an inflator-side edge which corresponds substantially to the circular cross section of the inflator bottom section, and a plurality of slots radially outward and continuous from said inflator-side edge, said body adjacent said slots is bent away from the plane of the body to form a pocket, said pocket open to said inflator-side edge;

wherein said inflator is placed onto said module housing and rotated such that said flanges pass through said slots of said module housing and into said pockets on said module housing holding said inflator onto said module housing body adjacent said inflator-side edge.

5. The assembly of claim 4 further comprising a bump on the bottom of said pocket, said bump engaging with the trailing edge of said flanges to prevent the backward rotation of the inflator.

6. An air bag inflator module assembly comprising:

an air bag inflator comprising a top section having a substantially circular cross section, a side edge, and a base plate extending radially outward from side edge of said air bag inflator; and a bottom section having a substantially circular cross section, and a side edge;

a bracket having an inner aperture which corresponds substantially to the circular cross section of said air bag inflator top section, an outer edge and a plurality of flanges extending outwardly from said outer edge, wherein said air bag top section is inserted through said bracket aperture and said bracket is placed in contact with said air bag inflator base plate;

a module housing comprising a mounting edge, a body defining a plane having a top surface and a bottom surface, an inflator-side edge which corresponds substantially to the circular cross section of the inflator bottom section, and a plurality of L-shaped tabs extending from the top surface of said module body; and wherein said air bag inflator with said bracket attached is placed on said module housing and said bracket is rotated such that said flanges of said bracket pass under the L-shaped tabs and engage therewith to hold said inflator between said bracket and said module housing body.

7. An air bag inflator module assembly comprising:

an air bag inflator comprising a top section having a substantially circular cross section, a side edge, and a base plate extending radially outward from side edge of said air bag inflator; and a bottom section having a substantially circular cross section, and a side edge;

a bracket having an inner aperture which corresponds substantially to the circular cross section of said air bag inflator top section, an outer edge and a plurality of L-shaped tabs extending perpendicularly from the surface of the bracket, wherein said air bag top section is inserted through said bracket aperture and said bracket is placed in contact with said air bag inflator base plate;

a module housing comprising a mounting edge, a body defining a plane having a top surface and a bottom surface, an inflator-side edge which corresponds substantially to the circular cross section of the inflator bottom section, and a plurality of apertures extending through said module body; and wherein said air bag inflator with said bracket attached is placed on said module housing, such that the base of each of the L-shaped tabs pass through one of the apertures in the module housing and said bracket is rotated such that each of said L-shaped tabs engages with said module housing body to hold said inflator between said bracket and said module housing body.

* * * * *

UNITED STATES PATENT AND TRADEMARK OFFICE
CERTIFICATE OF CORRECTION

PATENT NO. : 5,445,406
DATED : 29 August 1995
INVENTOR(S) : David V. Jones

It is certified that error appears in the above-indentified patent and that said Letters Patent is hereby corrected as shown below:

At column 4, line 58, "device" should be --assembly--.

Signed and Sealed this

Thirtieth Day of July, 1996

Attest:

BRUCE LEHMAN

*Attesting Officer*    *Commissioner of Patents and Trademarks*